(12) United States Patent
Liu

(10) Patent No.: US 11,446,912 B2
(45) Date of Patent: Sep. 20, 2022

(54) SCREEN PROTECTOR PASTING BOX

(71) Applicant: Shenzhen KAC Technology Co., Ltd., Shenzhen (CN)

(72) Inventor: Pinyuan Liu, Shenzhen (CN)

(73) Assignee: SHENZHEN KAC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/408,376

(22) Filed: Aug. 21, 2021

(65) Prior Publication Data
US 2022/0055362 A1 Feb. 24, 2022

(30) Foreign Application Priority Data

Aug. 21, 2020 (CN) .............................. 202021784271
Aug. 21, 2020 (CN) .............................. 202021785748
Jun. 16, 2021 (CN) .............................. 202121344727

(51) Int. Cl.
*B32B 37/00* (2006.01)
*B32B 37/10* (2006.01)

(52) U.S. Cl.
CPC ........ *B32B 37/003* (2013.01); *B32B 37/0053* (2013.01); *B32B 37/10* (2013.01); *B32B 2457/20* (2013.01)

(58) Field of Classification Search
CPC ............ B29C 65/7802; B29C 65/7832; B29C 2063/0008; B32B 37/003
See application file for complete search history.

(56) References Cited

U.S. PATENT DOCUMENTS

| | | | | |
|---|---|---|---|---|
| 2014/0338829 | A1* | 11/2014 | Peng | ................... B29C 63/0004 156/349 |
| 2015/0000831 | A1* | 1/2015 | Wang | .................. B29C 63/0004 156/391 |
| 2017/0253014 | A1* | 9/2017 | Kleeman | ................. B32B 27/36 |
| 2018/0281373 | A1* | 10/2018 | Lin | ....................... B32B 37/025 |
| 2020/0147859 | A1* | 5/2020 | Zhou | ................... B29C 63/0073 |
| 2020/0198222 | A1* | 6/2020 | Sorensen | ................ B29C 63/02 |
| 2021/0046692 | A1* | 2/2021 | Vinson | ................ B29C 63/0004 |

FOREIGN PATENT DOCUMENTS

| | | |
|---|---|---|
| CN | 202987565 U | 6/2013 |
| CN | 203439302 U | 2/2014 |
| CN | 203652156 U | 6/2014 |
| CN | 203681932 U | 7/2014 |

(Continued)

*Primary Examiner* — Philip C Tucker
*Assistant Examiner* — John Blades
(74) *Attorney, Agent, or Firm* — Andrew C. Cheng

(57) ABSTRACT

The present invention provides a screen protector pasting box for pasting a screen protector to an electronic device. A film includes an auxiliary positioning element and a screen protector positioned on the auxiliary positioning element. The screen protector pasting box includes a box body. The box body includes a lower housing and a connecting member connected to and accommodated in the lower housing for placing the electronic device. The connecting member includes a positioning portion for positioning the auxiliary positioning element to paste the screen protector to a screen of the electronic device. The screen protector pasting box has advantages of no bubbles during pasting the film and high integrity of the film pasting.

15 Claims, 16 Drawing Sheets

(56) References Cited

FOREIGN PATENT DOCUMENTS

| | | |
|---|---|---|
| CN | 203921282 U | 11/2014 |
| CN | 104210692 A | 12/2014 |
| CN | 206826987 U | 1/2018 |
| CN | 207482269 U | 6/2018 |
| CN | 210942430 U | 7/2020 |
| WO | 2017128366 A1 | 8/2017 |

* cited by examiner

SCREEN PROTECTOR PASTING BOX

TECHNICAL FIELD

The present invention relates generally to the technical field of film pasting, and more particularly to a screen protector pasting box.

BACKGROUND

With the continuous development of society, more and more people use touch-screen smartphones. In order to prevent phones from damage and to increase the overall service life of phones, many people choose to paste a film on the phone screen. However, if the film is not properly pasted, air bubbles may exist between the film and the phone screen. And the pressure applied to the screen to wipe off air bubbles cannot be too high, otherwise, the screen may be damaged. Therefore, the film pasting requires high-level skills. Currently, a device that can assist in pasting the film and prevent air bubbles from existing is in demand.

SUMMARY

To overcome the defect that air bubbles may easily appears in the existing film pasting, the present invention provides a screen protector pasting box.

To solve the technical problem, an embodiment of the present invention provides a screen protector pasting box for pasting a screen protector to an electronic device. A film includes an auxiliary positioning element and a screen protector positioned on the auxiliary positioning element. The screen protector pasting box includes a box body. The box body includes a lower housing and a connecting member connected to and accommodated in the lower housing for placing the electronic device. The connecting member includes a positioning portion for positioning the auxiliary positioning element to paste the screen protector to a screen of the electronic device.

Preferably, a surface, where the electronic device is contacted to the box body, is defined as a placing plane. A surface, where the positioning portion and the auxiliary positioning element are connected, is defined as a positioning plane. The positioning plane and the placing plane are relatively inclined.

Preferably, the connecting member defines an accommodating space for accommodating the electronic device. The positioning portion includes a first positioning member or a first positioning hole which is disposed at an end of the connecting member. The auxiliary positioning element includes a through hole corresponding to the first positioning member, or a connecting column corresponding to the first positioning hole. Or, the positioning portion includes the first positioning member which is disposed on an inner wall of the accommodating space, for overlapping one end of the auxiliary positioning element, and the first positioning member is deformable.

Preferably, the positioning portion further includes a second positioning member. The first positioning member and the second positioning member are disposed on two opposite ends of the connecting member. Or, the positioning portion further includes a second positioning hole, the first positioning hole and the second positioning hole are disposed on two opposite ends of the connecting member. Or, the first positioning member and the second positioning hole are disposed on two opposite ends of the connecting member. Or, the first positioning hole and the second positioning member are disposed on two opposite ends of the connecting member. The auxiliary positioning element includes the through hole corresponding to the second positioning member, or the connecting column corresponding to the second positioning hole.

Preferably, the positioning plane includes a first locating surface. Or the positioning plane includes the first locating surface and a second locating surface. The first positioning member or the first positioning hole defines the first locating surface, the second positioning member or the second positioning hole defines the second locating surface. The auxiliary positioning element is positioned on the first locating surface, or the auxiliary positioning element is positioned on the first locating surface and the second locating surface.

Preferably, when the positioning plane includes the first positioning member or the first positioning hole, the positioning plane includes the first locating surface. When the electronic device is placed in the accommodating space, the height of the first locating surface is higher than that of the screen of the electronic device, and the placing plane is parallel to a horizontal plane. Or, the height of the first locating surface is equal to that of the second locating surface, and the placing plane forms an angle with the horizontal plane. Or, the height of the first locating surface is higher than that of the second locating surface, and the placing plane is parallel to the horizontal plane.

Preferably, the auxiliary positioning element includes a top board and a side board connected to the top board. The top board and the side board enclose to form a space with an inner size matching the size of the electronic device. The screen protector is detachably connected to the top board. When the top board is opposite to the screen of the electronic device, the side board corresponds to sides of the electronic device. The side board corresponding to the first positioning member resists the first positioning member disposed on the inner wall of the accommodating space.

Preferably, the first positioning member matches with the through hole.

Preferably, the box body further includes a rolling member and a guide rail disposed on the lower housing. The rolling member can slide relative to the guide rail; the rolling member slides from one side with a smaller angle between the positioning plane and the placing plane to the other side with a larger angle.

Preferably, the screen protector pasting box further includes an upper housing and a slider connected to two opposite sides of the upper housing. The rolling member is rotatably connected to the upper housing and the slider. The slider matches and slides on the guide rail.

Preferably, the screen protector pasting box further includes a limiting element connected to both sides of the upper housing where the slider is disposed. And the connecting member defines a recess corresponding to the limiting element. When the slider slides to an end of the guide rail closed to the recess, the limiting element is rotatably against the recess; the upper housing can be accommodated in the box body.

Preferably, the limiting element includes an arc surface, and the recess includes an inclined surface. The arc surface resists against the inclined surface.

Preferably, the lower housing defines a slot between the connecting member and the guide rail for the limiting element being movably received therein.

Preferably, the number of the first positioning member or that of the first positioning hole is two. The number of the second positioning member or that of the second positioning hole is one.

Preferably, the rolling member includes a first rolling part and a second rolling part disposed on two ends of the first rolling part. The hardness of the second rolling part is higher than that of the first rolling part. Or the second rolling part is convex relative to the first rolling part.

Preferably, the connecting member and the lower housing are detachably connected.

Preferably, the lower housing includes an engagement block, and the connecting member is provided with an engagement hole for engaging the engagement block.

Preferably, the lower housing defines a groove for accommodating a camera area of the electronic device.

Compared with the prior arts, the screen protector pasting box provided in the present invention has the following beneficial effects.

The film includes an auxiliary positioning element and a screen protector positioned on the auxiliary positioning element. The screen protector pasting box includes a box body which includes a lower housing and a connecting member connected to and accommodated in the lower housing, for placing the electronic device. The connecting member includes a positioning portion for positioning the auxiliary positioning element and attaching the screen protector to the screen of the electronic device. And the positioning portion also makes the screen protector inclined relative to the electronic device, which further prevents the generation of air bubbles during the film pasting, and improves the integrity of the film pasting.

The connecting member is provided with a first positioning member or a first positioning hole thereon, for positioning the auxiliary positioning element, which can reduce the size of the box body.

The box body includes a first positioning member and a second positioning member respectively disposed on two opposite ends of the connecting member for positioning the film. The electronic device is placed on the connecting member and between the first positioning member and the second positioning member. The film can be positioned to the first positioning member and the second positioning member, which can effectively prevent the derivation of the film and improve the precision of the film pasting.

The positioning plane and the placing plane are relatively inclined, which can further prevent the generation of air bubbles during pasting the film and improve the integrity of the film pasting.

The auxiliary positioning element includes a top board and a side board, for positioning the film, which is convenient for operation.

The space enclosed by the top board and the side board defines a positioning portion, and the space matches the size of the screen protector, which can help quickly position the screen protector in the case.

The box body includes a rolling member and a guide rail. The guide rail is connected to the lower housing, and the rolling member can slide relative to the guide rail. The rolling member evenly presses the film to the screen of the electronic device, which can prevents the generation of air bubbles during the film pasting.

The connecting member defines an accommodating space formed by the depression of the surface of the connecting member for accommodating the electronic device, and a groove communicated with the accommodating space. The groove corresponds to the camera area of the electronic device, which can protect the camera area of the electronic device.

The connecting member defines at least a concave portion corresponding to the power button area, the volume button area or the power plug area of the electronic device. With this design, the user can easily take and place electronic devices.

Further beneficial effects of the present invention will become apparent from a consideration of the drawings and ensuing description.

NUMERICAL REFERENCE IDENTIFICATION

10. Screen protector pasting box; 20. Electronic device; 21, Film; 22. Screen protector; 23. Hole; 23a. Connecting column; 24. Auxiliary positioning element; 30. Box body; 31. Connecting member; 311. Recess; 312. Inclined surface; 313. Accommodating space; 314. Groove; 315. Block; 316. Slot; 317. Concave portion; 318. Engagement hole; 32. First positioning member; 321. First column; 322. First stopper; 323. First locating surface; 32a. First positioning hole; 323a. First locating surface; 33. Second positioning member; 331. Second column; 332. Second stopper; 333, Second locating surface; 33a. Second positioning hole; 333a. Second locating surface; 34. Protrusion; 35. Guide rail; 36. Lower housing; 361. Engagement block; 38. Chamber; 39. Guide groove; 40. Rolling member; 401. First rolling part; 402. Second rolling part; 41. Rotating shaft; 50. Moving assembly; 51. Upper housing; 52. Slider; 53. Limiting element; 531. Arc surface;

70. Screen protector pasting box; 71. Connecting member; 24a. Auxiliary positioning element; 32b. First positioning member; 721. Top board; 722. Side board; 73. Positioning portion; 76. Lug;

80. Film; 81. Auxiliary positioning element; 82. Screen protector; 83. Release film; 831. Tip.

DETAILED DESCRIPTION

In order to make the objectives, technical solutions, and advantages of the present invention clearer, the present invention is further described in detail below with reference to the accompanying drawings and embodiments. It should be understood that the specific embodiments described herein are provided for illustration only, and not for the purpose of limiting the invention.

Figure 1:
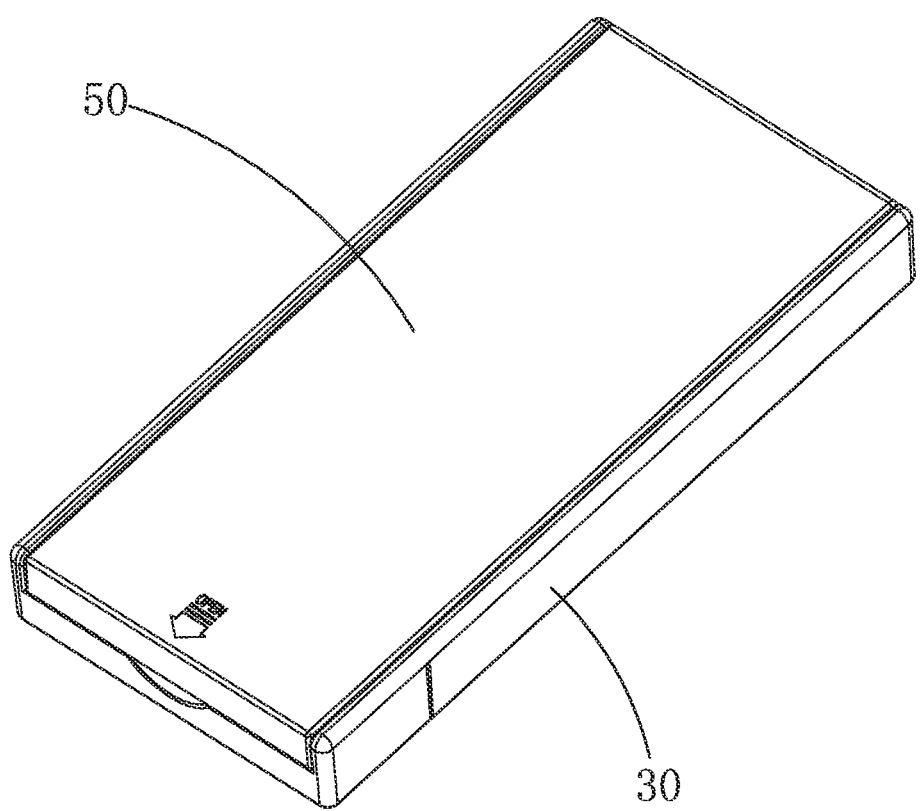
FIG. 1 is a perspective view of a screen protector pasting box in a closed state according to a first embodiment of the present invention.
Figure 2:
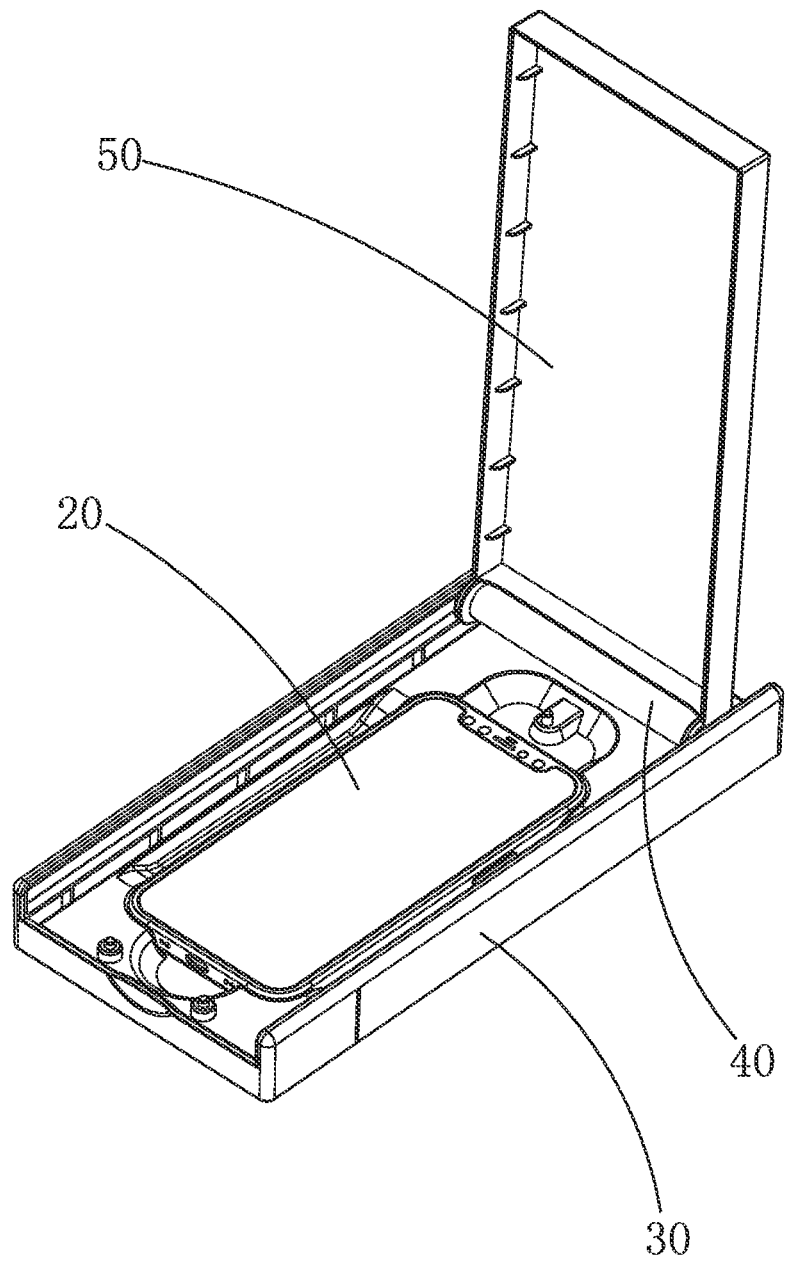
FIG. 2 is a perspective view of the screen protector pasting box in an open state according to the first embodiment of the present invention.
Figure 3:
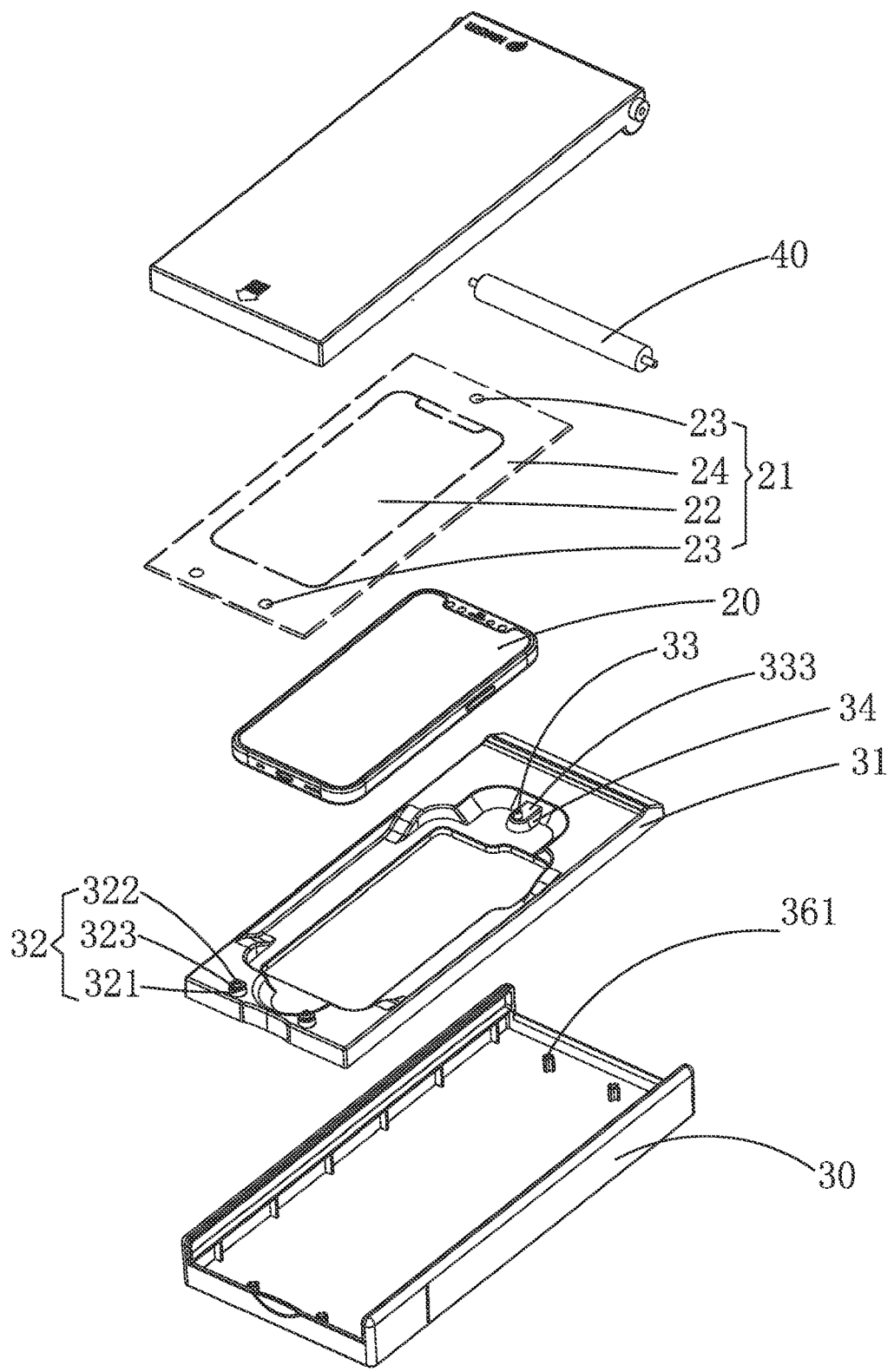
FIG. 3 is an exploded schematic diagram of the screen protector pasting box according to the first embodiment of the present invention.

Referring to FIGS. 1-3, a first embodiment of the present invention provides a screen protector pasting box 10 for pasting a screen protector to an electronic device 20. The screen protector pasting box 10 includes a box body 30, a rolling member 40 slidably connected to the box body 30, and a moving assembly 50 rotatably connected to the rolling member 40. The rolling member 40 can slide relative to the box body 30 to paste the screen protector to the electronic device 20.

The electronic device 20 may be any of a mobile phone, a tablet computer or a game console. A film 21 includes a screen protector 22 corresponding to the screen of the electronic device 20 and an auxiliary positioning element 24 connected to the screen protector 22 in an adhered way. The screen protector 22 can be tearing foil or anti peep film. The area of the film 21 is larger than that of the screen, and the area of the screen protector 22 is equivalent to that of the screen. The auxiliary positioning element 24 is around the screen protector 22 for assisting the film 21 to be pasted to the electronic device 20. The auxiliary positioning element 24 can be torn apart from the screen protector 22. More than two through holes 23 are defined on two opposite ends of the auxiliary positioning element 24 away from the screen protector 22.

Referring to FIG. 3 again, the box body 30 includes a connecting member 31 and a positioning portion for positioning the auxiliary positioning element 24 to attach the screen protector 22 to the screen of the electronic device 20. The positioning portion includes a first positioning member 32 and a second positioning member 33. The first positioning member 32 and the second positioning member 33 are respectively disposed on two opposite ends of the connecting member 31. The first positioning member 32 includes a first column 321 and a first stopper 322. Preferably, the first column 321 and the first stopper 322 are configured as cylindrical structures, and the shaft diameter of the first column 321 is larger than that of the first stopper 322. The first column 321 defines a first locating surface 323, and the first stopper 322 is positioned on the first locating surface 323. The connecting member 31 includes a protrusion 34 where the second positioning member 33 is disposed thereon. In this embodiment, the height of the first locating surface 323 is higher than that of the surface of the protrusion 34. Therefore, the first locating surface 323 and the surface of the protrusion 34 jointly define an inclined plane.

The electronic device 20 is placed on the connecting member 31 and between the first positioning member 32 and the second positioning member 33. The through holes 23 of the film 21 are defined to match the positions of the first positioning member 32 and the second positioning member 33 respectively. When pasting the film 21 to the electronic device 20, the film 21 is positioned on the first locating surface 323 and the surface of the protrusion 34 therethrough the through holes 23. The first stopper 322 and the second positioning member 33 respectively match with the first column 321 and the protrusion 34 to fix the film 21 thereon. Therefore, the film 21 is against the first locating surface 323 and the surface of the protrusion 34. In this case, the film 21 is placed and fixed on the inclined plane, while the screen protector 22 is positioned above the screen of the electronic device 20. It can be understood that the first positioning member 32 and the second positioning member 33 can prevent the derivation of the film 21 and improve the precision of the film pasting. The rolling member 40 slides from an end where the second positioning member 33 is disposed to the other end where the first positioning member 32 is disposed, so as to evenly press the film 21 to the electronic device 20 with the screen protector 22 correspondingly covering the screen of the electronic device 20 from a lower end to a higher end of the inclined plane. In this way, the screen protector pasting box 10 can prevent the generation of air bubbles during pasting the film 21, so as to improve the integrity of the film pasting.

Figure 4:
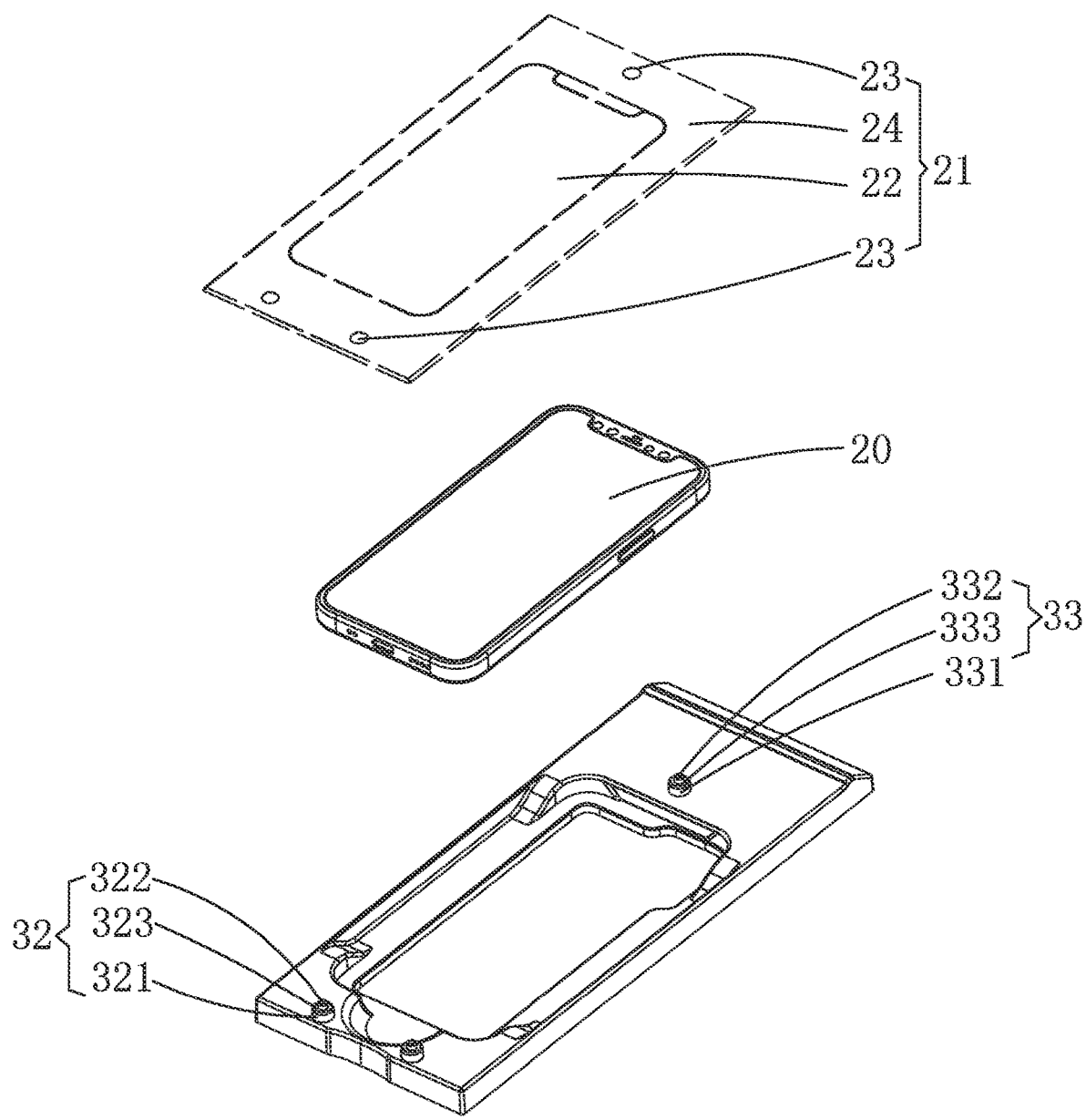
FIG. 4 is a perspective view of a film and a connecting member of the screen protector pasting box according to the first embodiment of the present invention.

Referring to FIG. 4, optionally, in some other embodiments, the second positioning member 33 is directly disposed on the connecting member 31. The second positioning member 33 has the same shape as the first positioning member 32. The second positioning member 33 includes a second column 331 and a second stopper 332. Preferably, the second column 331 and the second stopper 332 are configured as cylindrical structures, and the shaft diameter of the second column 331 is larger than that of the second stopper 332. The second column 331 defines a second locating surface 333, and the second stopper 332 is positioned on the second locating surface 333. In this embodiment, the height of the first column 321 is equal to that of the second column 331, therefore, the height of the surface of the first column 321 is equal to that of the second locating surface 333. The surface of the first column 321 and the second locating surface 333 jointly define a horizontal plane.

The first locating surface 323 and the second locating surface 333, or the first locating surface 323 and the surface of the protrusion 34 jointly define a positioning plane for positioning the film 21. The connecting member defines a placing plane for placing the electronic device 20. Optionally, the height of the first column 321 is higher than that of the second column 331 or the protrusion 34, that is, the height of the first locating surface 323 is higher than that of the second locating surface 333 or the surface of the protrusion 34. In this case, the positioning plane is relatively inclined to the placing plane. That is, the positioning plane and the placing plane relatively form an inclination angle.

Optionally, the height of the first column 321 is equal to that of the second column 331 or the protrusion 34, that is, the first locating surface 323 is equal to the second locating surface 333 or the surface of the protrusion 34. In this case, the placing plane is relatively inclined to the positioning plane. The thickness of the connecting member 31 gradually increases from the end where the second positioning member 33 is disposed toward the end where the first positioning member 32 is disposed.

Optionally, it can be feasible that the positioning plane and the placing plane are relatively inclined, so that the film 21 and the screen of the electronic device 20 are in relatively inclined connection, which can further prevent the generation of air bubbles during pasting the film 21.

Figure 4A:
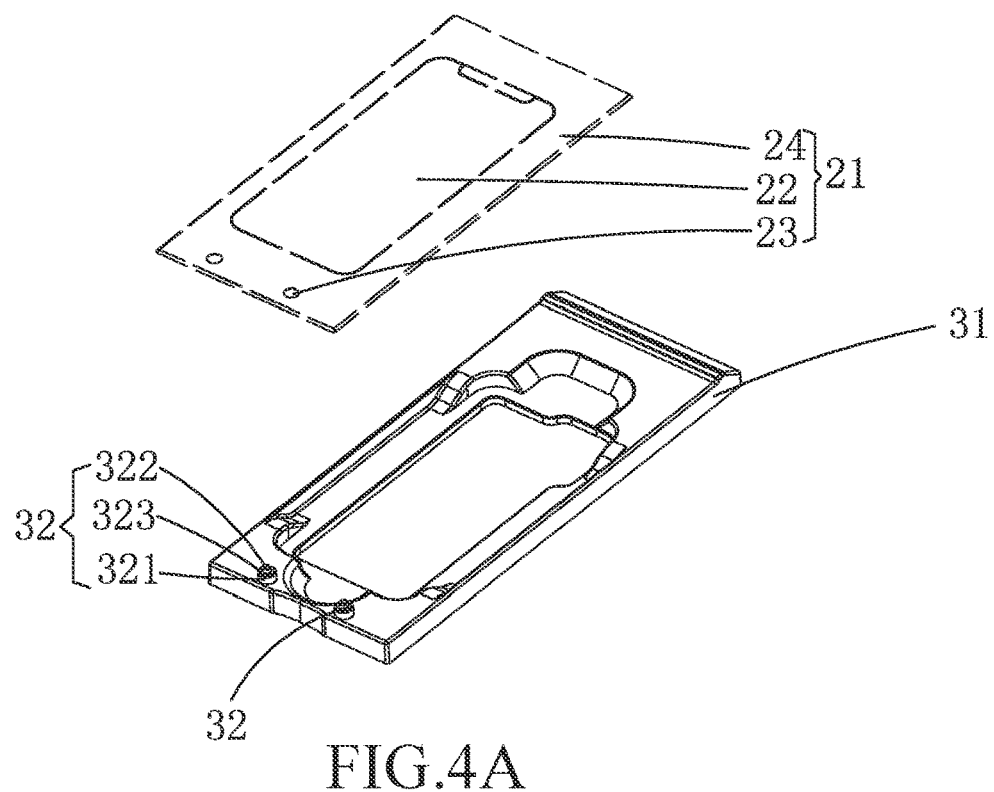
FIG. 4A is a perspective view of the film and the connecting member of the screen protector pasting box according to a first alternative embodiment of the present invention.

Referring to FIG. 4A, as a first alternative embodiment, the positioning portion only includes the first positioning member 32, with no second positioning member 33 and no protrusion 34. In this embodiment, due to the lack of the second positioning member 33, in order to better align the film 21 with the screen of the electronic device 20, the number of the first positioning member 32 is configured as two. The auxiliary positioning element 24 defines two through holes 23 corresponding to the first positioning member 32. Each first positioning member 32 is matched with the through holes 23, and they cannot rotate. Certainly, the number of the first positioning member 32 can also be other values, such as one, three or more.

Optionally, in order to further realize the positioning of the film 21 relative to the screen of the electronic device 20, the auxiliary positioning element 24 may be configured with certain rigidity. When the auxiliary positioning element 24 and the first positioning member 32 are connected, the auxiliary positioning element 24 has a fixed shape and will not be has a fixed shape and will not be easily deformed.

In this embodiment, the positioning plane includes the first locating surface 323. When the electronic device 20 is placed in the connector 31, the height of the first locating surface 323 is higher than that of the screen of the electronic device 20. The placing plane is parallel to the horizontal plane, so that the first locating surface 323 is relatively inclined to the placing plane.

Figure 4B:
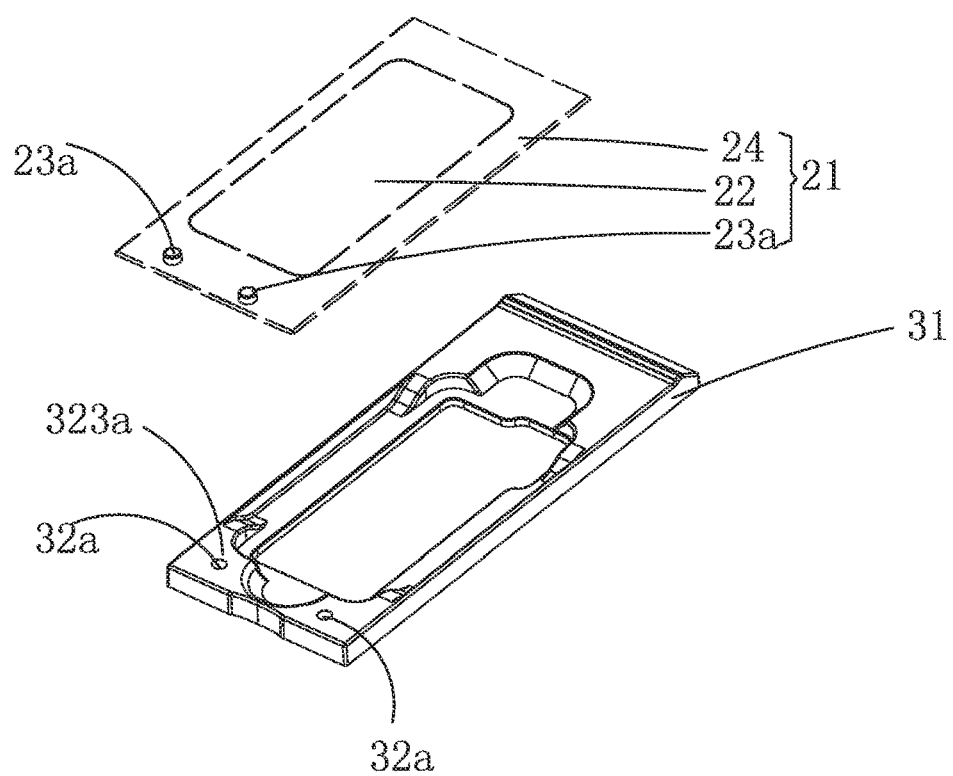
FIG. 4B is a perspective view of the film and the connecting member of the screen protector pasting box according to a second alternative embodiment of the present invention.

Referring to FIG. 4B, as a second alternative embodiment, the positioning portion only includes a first positioning hole 32a, that is, the first positioning member 32 is replaced with the first positioning hole 32a. At this time, the auxiliary positioning element 24 needs to be provided with a connecting column 23a to match the first positioning hole 32a. The connecting column 23a is inserted into the first positioning hole 32a to position the auxiliary positioning element 24. The first positioning hole 32a defines a first locating surface 323a. It can be understood that, when the connecting column 23a is completely inserted into the first positioning hole 32a, the surface of the first positioning hole 32a defines the first locating surface 323a. When the height of the connecting column 23a is higher than the depth of the first positioning hole 32a, the connecting column 23a is supported based on the bottom of the first positioning hole 32a. At this time, the bottom of the first positioning hole 32a defines the first locating surface 323a.

Figure 4C:
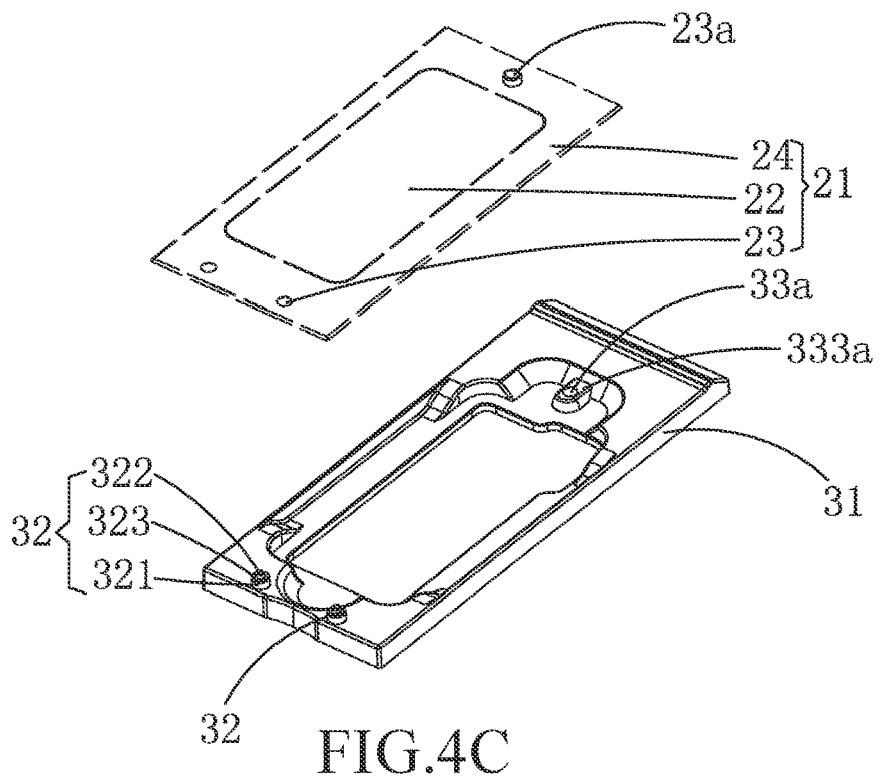
FIG. 4C is a perspective view of the film and the connecting member of the screen protector pasting box according to a third alternative embodiment of the present invention.

Referring to FIG. 4C, as a third alternative embodiment, the positioning portion includes the first positioning member 32 and a second positioning hole 33a. That is, the second positioning member 33 is replaced with the second positioning hole 33a. At this time, the auxiliary positioning element 24 is provided with a connecting column 23a corresponding to the second positioning hole 33a. The second positioning hole 33a defines a second locating surface 333a.

Figure 4D:
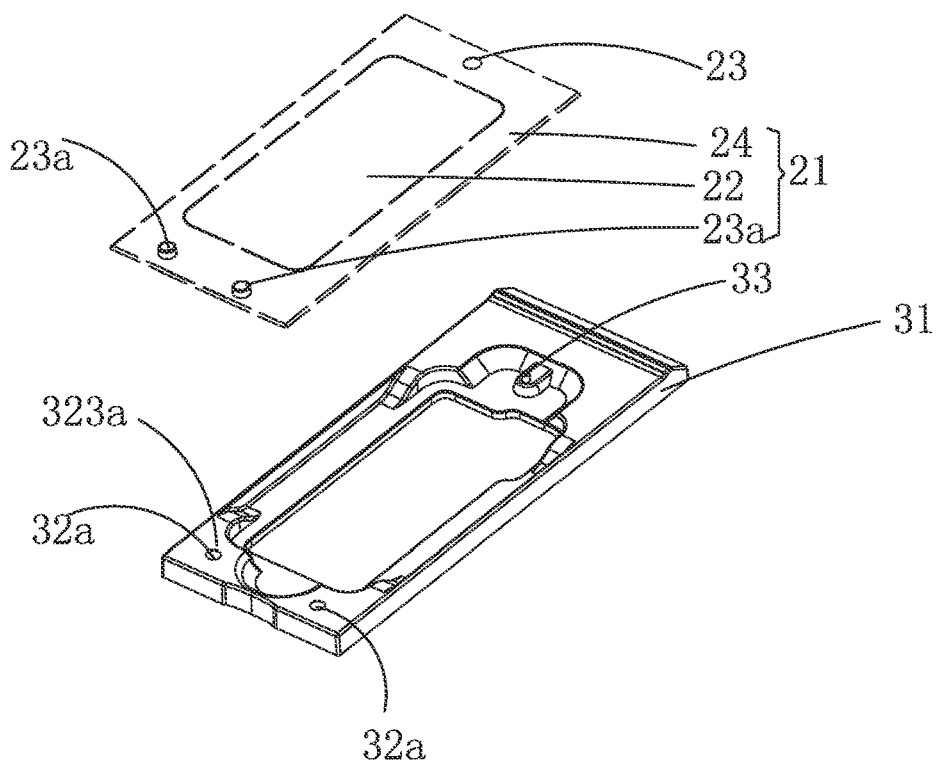
FIG. 4D is a perspective view of the film and the connecting member of the screen protector pasting box according to a fourth alternative embodiment of the present invention.

Referring to FIG. 4D, as a fourth alternative embodiment, the positioning portion includes the first positioning hole 32a and the second positioning member 33. The first positioning hole 32a and the second positioning member 33 are provided at both ends of the connecting member 31.

Figure 4E:
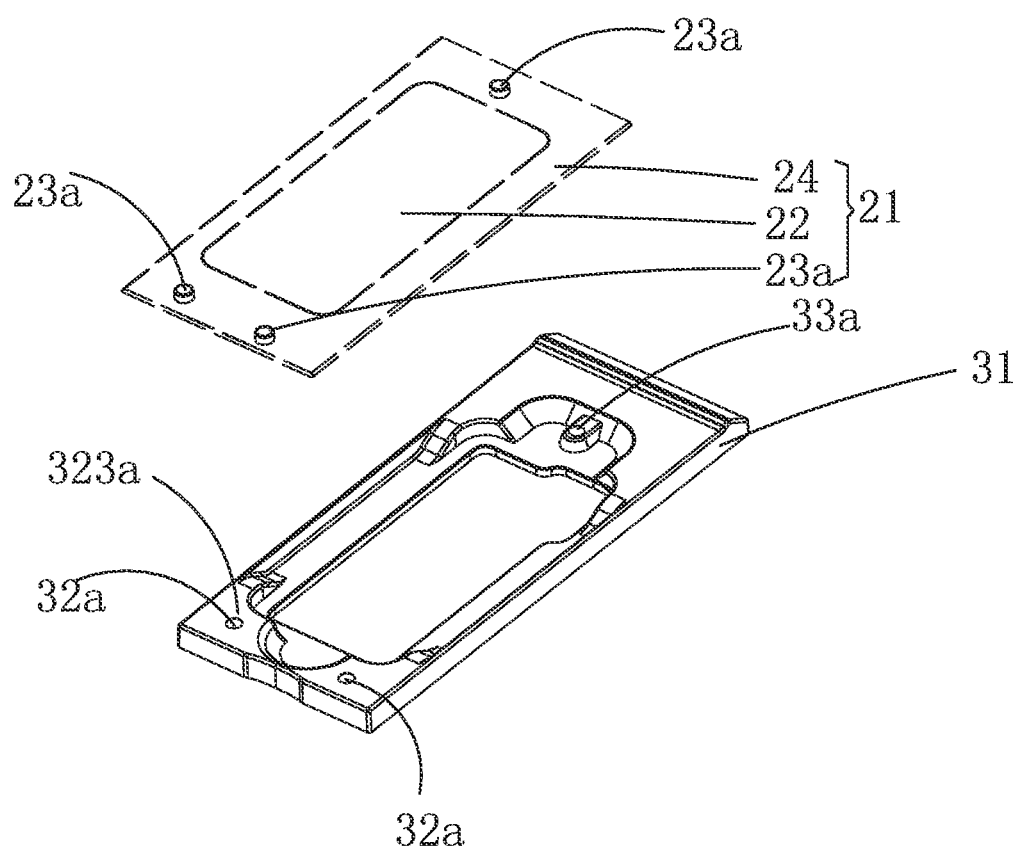
FIG. 4E is a perspective view of the film and the connecting member of the screen protector pasting box according to a fifth alternative embodiment of the present invention.

Referring to FIG. 4E, as a fifth alternative embodiment, the positioning portion includes the positioning hole 32a and the second positioning hole 33a. The positioning hole 32a and the second positioning hole 33a are provided at both ends of the connecting member 31.

Figure 5:
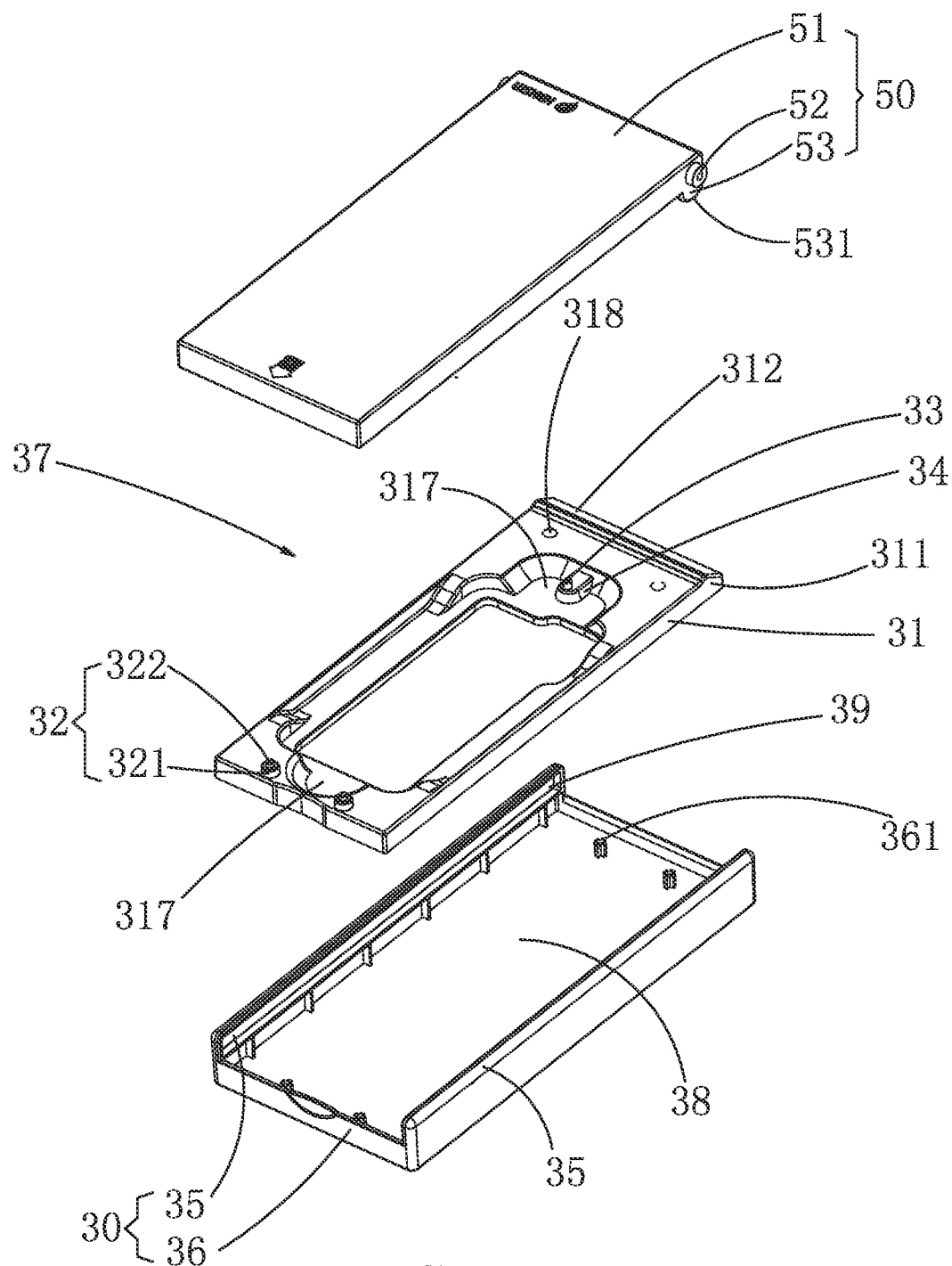
FIG. 5 is another exploded schematic diagram of the screen protector pasting box according to the first embodiment of the present invention.

Referring to FIG. 5, the moving assembly 50 includes an upper housing 51 and a slider 52. The upper housing 51 can be accommodated in the box body 30. The slider 52 has a hollow columnar structure and is disposed on two opposite sides of the upper housing 51. The moving assembly 50 can slide relative to the connecting member 31 and slide between the first positioning member 32 and the second positioning member 33.

Figure 6:
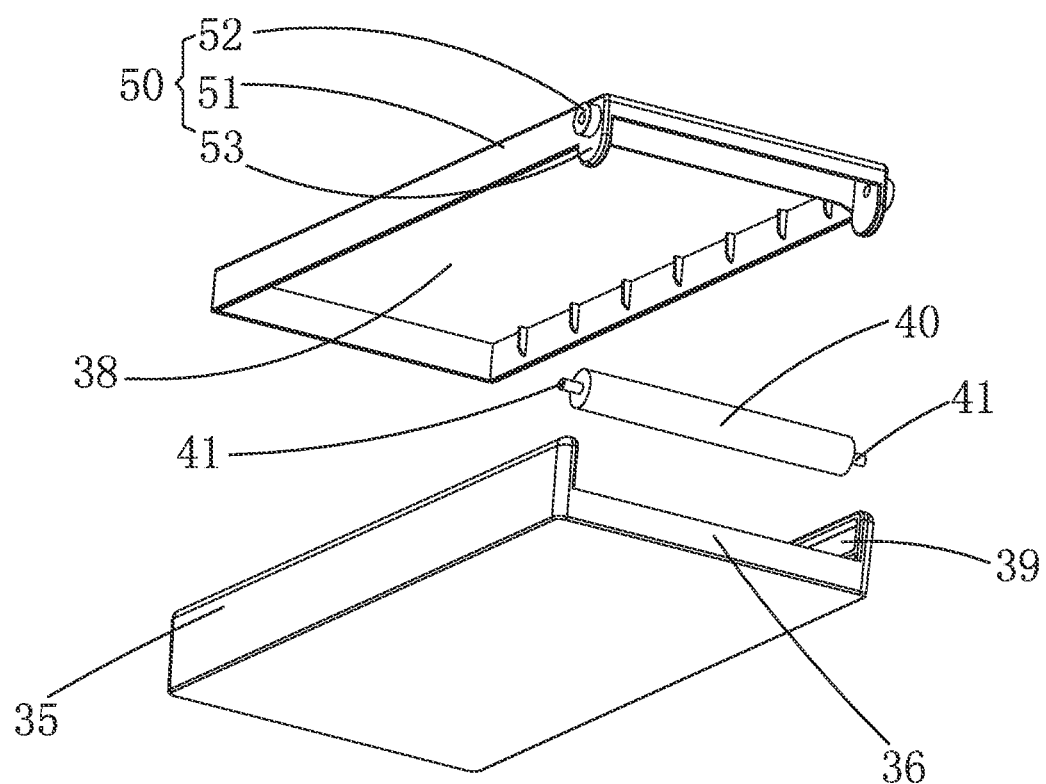
FIG. 6 is an exploded schematic diagram of the screen protector pasting box according to the first embodiment of the present invention.
Figure 7:
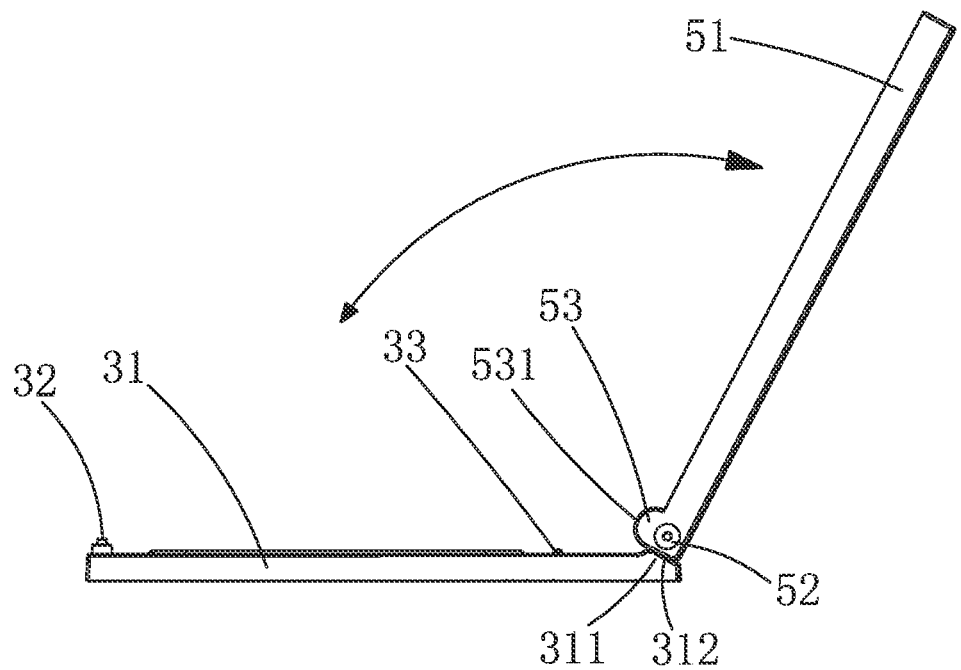
FIG. 7 is a schematic diagram illustrating the rotation of the screen protector pasting box according to the first embodiment of the present invention.

Referring to FIG. 6 and FIG. 7, the rolling member 40 includes a rotating shaft 41 therethrough. The rotating shaft 41 successively penetrates the upper housing 51 and the slider 52 on both sides. The rolling member 40 is rotatably connected to the moving assembly 50 through the rotating shaft 41. In this embodiment, the rolling member 40 is a roller, and the material of the rolling member 40 is silica gel or rubber. Optionally, the rolling member 40 may be a sliding block, a scraper or any parts that can slide and press the film 21. The distance between the rolling member 40 and the connecting member 31 is in the range of 1-2 mm, preferably 1.5 mm.

The moving assembly 50 further includes a limiting element 53 connected to both sides of the upper housing 51 where the slider is disposed. The limiting element 53 includes an extending portion, and the surface of the extending portion is preferably an arc surface 531. The connecting member 31 defines a recess 311 at the end thereof corresponding to the limiting element 53. The recess 311 defines an inclined surface 312. When the slider 52 slides to an end of the connecting member 31 closed to the recess 311, the limiting element 53 is rotatably against the inclined surface 312 of the recess 311. That is, the upper housing 51 can rotate relative to the connecting member 31.

When the upper housing 51 rotates to a position where the extending portion is against the inclined surface 312, the upper housing 51 can slide relative to the connecting member 31 through the rolling member 40. In this case, the upper housing 51 and the connecting member 31 form an angle of tilt due to the limiting element 53 resists the two edges of the connecting member 31. It is easy and clear to see the whole process of the film 21 pasting onto the electronic device 20 through the angle of tilt.

Figure 5A:
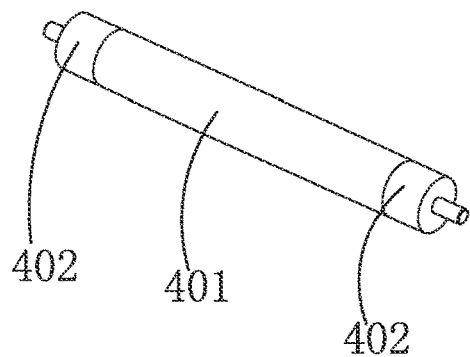
FIG. 5A is a schematic diagram of a rolling member of the screen protector pasting box according to the first embodiment of the present invention.

Referring to FIG. 5A, as an alternative embodiment, the rolling member 40 includes a first rolling part 401 and a second rolling part 402 disposed on two ends of the first rolling part 401. The rolling member 40 is configured as a long-bar cylindrical structure. The first rolling part 401 and the second rolling part 402 is divided along a lengthwise direction of the rolling member 40. The hardness of the second rolling part 402 is higher than that of the first rolling part 401. Thus, when the rolling member 40 are pressing, the first rolling part 401 and the second rolling part 402 respectively form different pressure values. The pressure value of the second rolling part 402 is larger than that of the first rolling part 401, which is especially applicable for pasting films on electronic devices with curved screens.

Figure 5B:
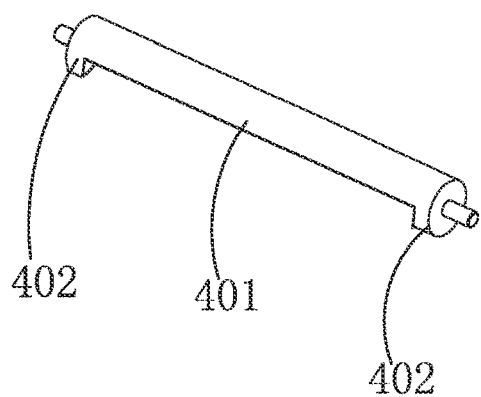
FIG. 5B is a schematic diagram of the rolling member of the screen protector pasting box according to an alternative embodiment of the present invention.

Referring to FIG. 5B, the second rolling part 402 is convex relative to the first rolling part 401. The second rolling part 402 corresponds to an area of the electronic devices with curved screens.

Figure 8:
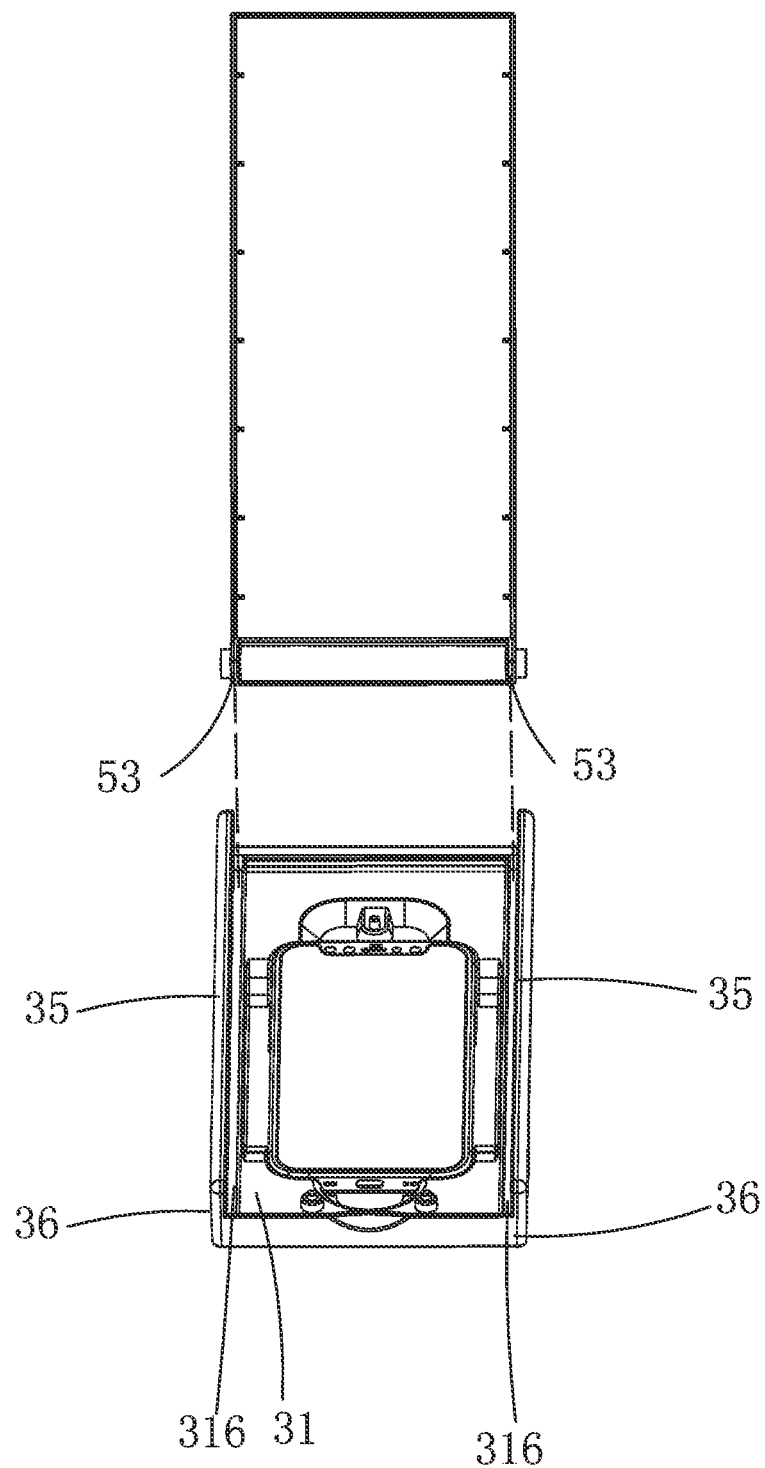
FIG. 8 is a schematic diagram of an upper housing and a lower housing in a separated state of the screen protector pasting box according to the first embodiment of the present invention.

Referring to FIG. 5 and FIG. 8, the box body 30 further includes a lower housing 36, and a guide rail 35 connected to and disposed on two opposite sides of the lower housing 36. The connecting member 31 is detachably connected to the lower housing 36. The slider 52 slides on the guide rail 35. Each guide rail 35 defines a guide groove 39 for accommodating the slider 52. The guide groove 39 match the slider 52. Two inner walls on opposite sides of the guide groove 39 can limit the moving distance of the slider 52. The lower housing 36 defines a slot 316 between the connecting member 31 and the guide rail 35. The limiting element 53 moves in the slot 316. The lower housing 36 and the upper housing 51 together defines a chamber 38 for accommodating the connecting member. The lower housing 36 can be provided with an engagement block 361, and the connecting member 31 is provided with an engagement hole 318 for engaging the engagement block 361. The engagement block 361 and the engagement hole 318 engage to realize the detachable connection between the lower housing 36 and the connecting member 31.

Figure 9:
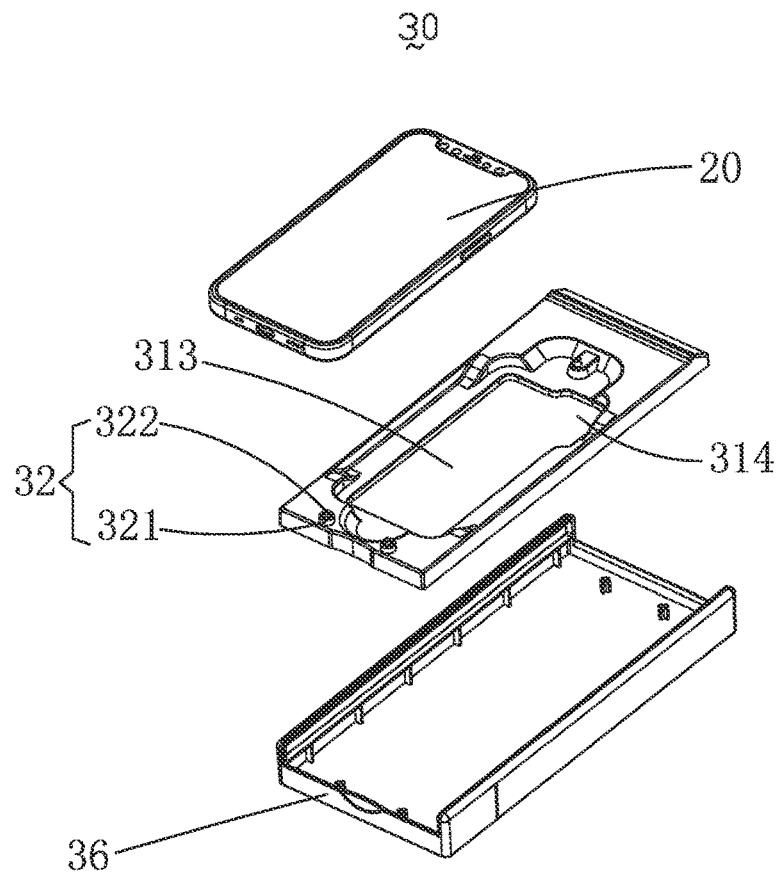
FIG. 9 is an exploded schematic diagram of the lower housing and the connecting member of the screen protector pasting box according to the first embodiment of the present invention.

Referring to FIG. 5 and FIG. 9, the connecting member 31 defines at least a concave portion 317 corresponding to the power button area, the volume button area or the power plug area of the electronic device 20. In this embodiment, the number of the concave portion 317 is two, one concave portion 3117 is defined between the two first positioning members 32, while the other concave portion 317 is defined adjacent to the second positioning member 33. The second positioning member 33 is disposed on the protrusion 34, and the protrusion 34 is accommodated in the concave portion 317. With this design, the user can easily take and place the electronic device 20 through the concave portion 317.

The connecting member 31 defines an accommodating space 313 for accommodating the electronic device 20. The accommodating space 313 is formed by the depression of the surface of the connecting member 31 for accommodating the electronic device 20. The accommodating space 313 communicates with the concave portion 317. The connecting member 31 further defines a groove 314 communicated with the accommodating space 313. The groove 314 corresponds to the camera area of the electronic device 20, and is used for accommodating and protecting the camera area of the electronic device 20.

Figure 10:
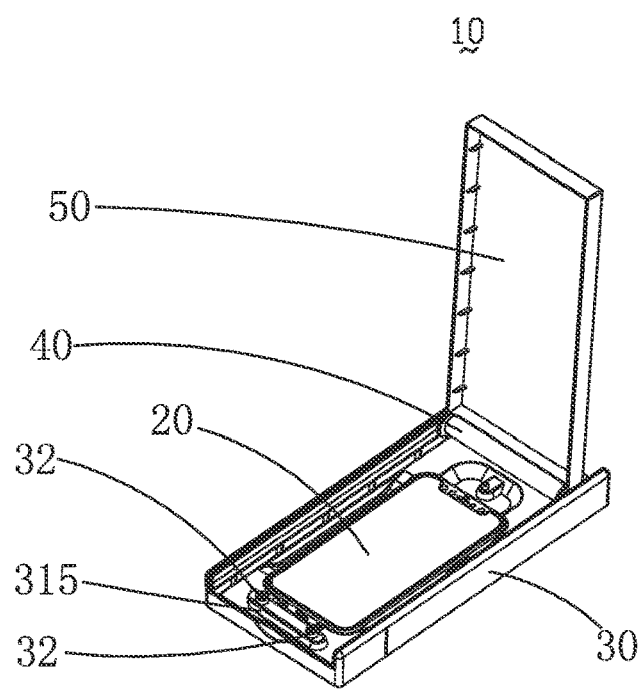
FIG. 10 is another perspective view of the screen protector pasting box in an open state according to the first embodiment of the present invention.

Referring to FIG. 10, optionally, in some other embodiments, the connecting member 31 includes a block 315 protruding on an end of the connecting member 31. The first positioning member 32 is disposed on the block 315. When the rolling member 40 slides toward the first positioning member 32, the rolling member 40 is resisted against the block 315.

Figure 11:
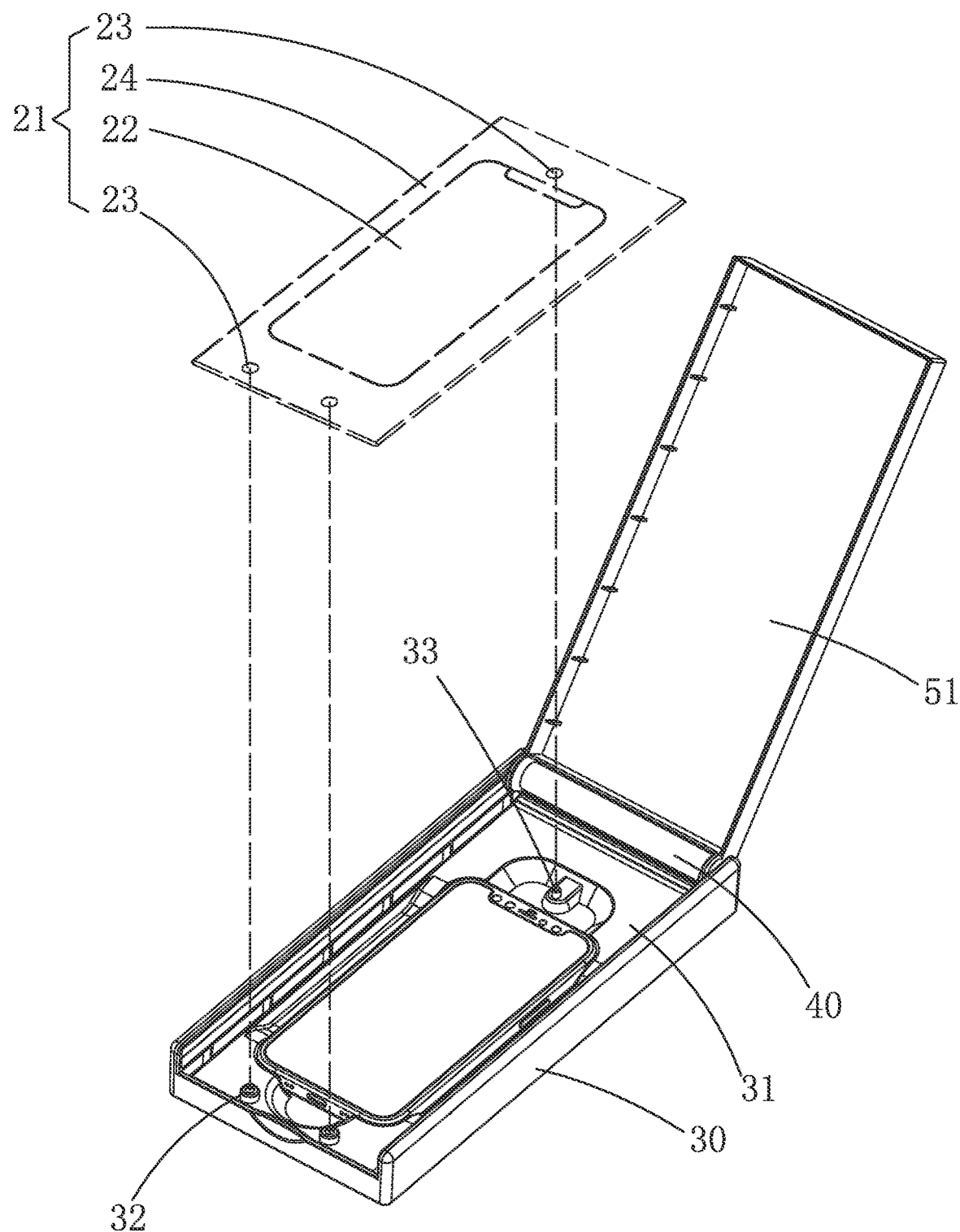
FIG. 11 is another perspective view of the screen protector pasting box in an open state according to the first embodiment of the present invention.

Referring to FIG. 11, when in use, the electronic device is accommodated in the connecting member 31, the film 21 is positioned and fixed on the first positioning member 32 and the second positioning member 33 therethrough the through holes 23. When the upper housing 51 rotates to a position where the rolling member 40 can slide relative to the box body 30, the rolling member 40 slides from an end where the second positioning member 33 is disposed to the other end where the first positioning member 32 is disposed, so as to evenly press the film 21 to the electronic device with the screen protector 22 correspondingly covering the screen of the electronic device, finally to finish the film pasting process. The user can see the whole process of the film 21 pasting onto the electronic device, through the angle of tilt formed between the upper housing 51 and the box body 30.

Figure 12:
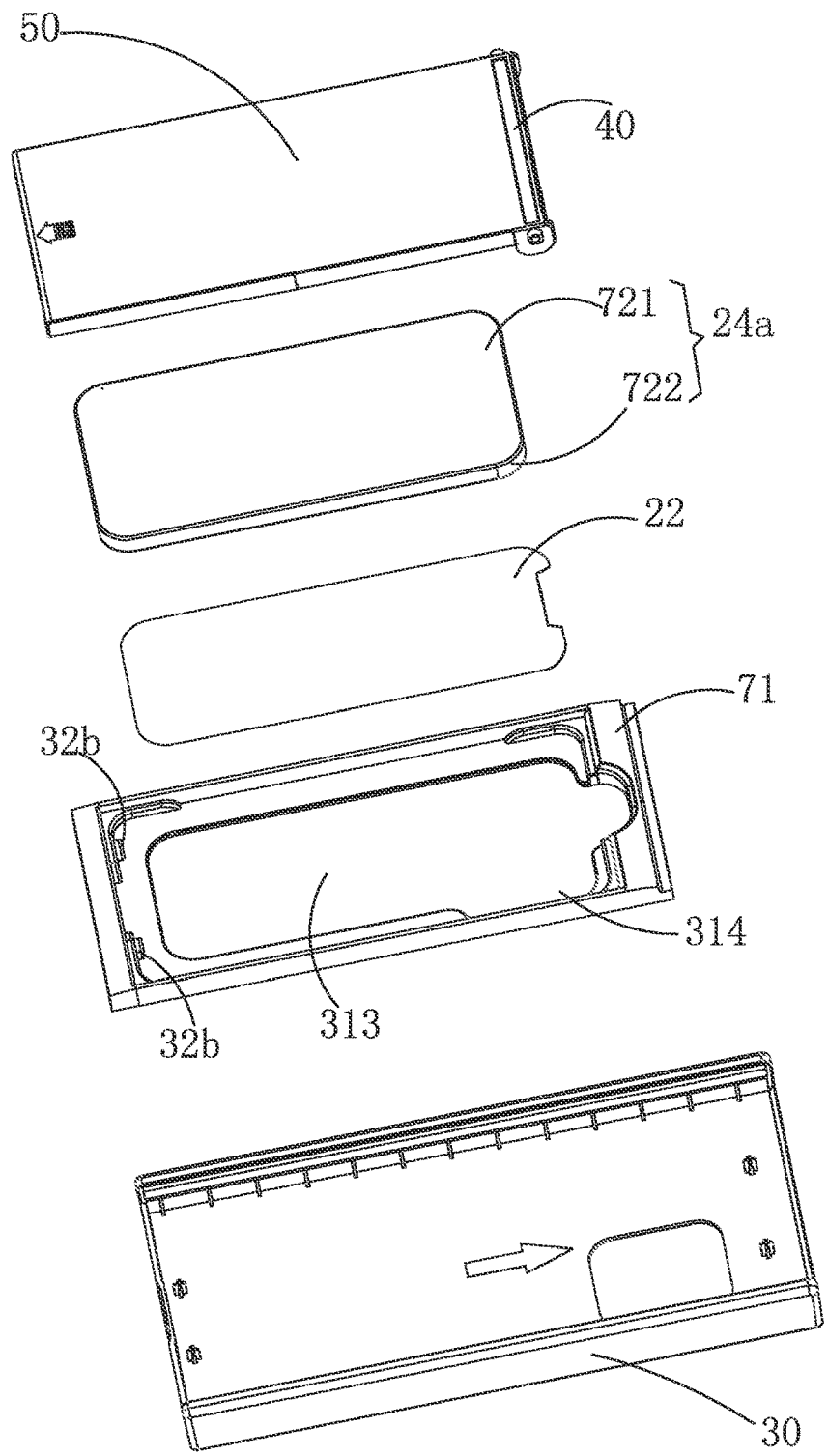
FIG. 12 is an exploded schematic diagram of the screen protector pasting box according to a second embodiment of the present invention.
Figure 13:
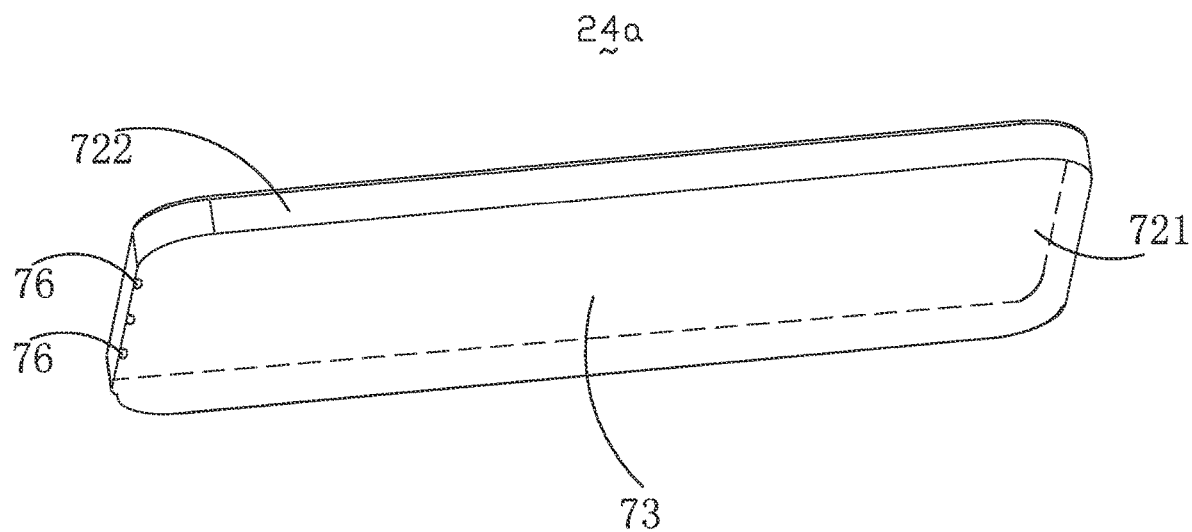
FIG. 13 is a schematic diagram of an inner side of a positioning member of the screen protector pasting box according to the second embodiment of the present invention.

Referring to FIGS. 12-13, a second embodiment of the present invention provides a screen protector pasting box 70, which is different from the screen protector pasting box 10 provided in the first embodiment and its alternative embodiments mainly in the structure of a connecting member 71. The positioning portion includes a first positioning member 32b disposed on the inner wall of the accommodating space 313, for overlapping one end of an auxiliary positioning element 24a. The first positioning member 32b is deformable. At this time, the first positioning member 32b defines the positioning plane. When in use, the auxiliary positioning element 24a corresponds to the screen of the electronic device and overlaps on the first positioning member 32b. The first positioning member 32b makes the auxiliary positioning element 24a inclined relative to the placing plane. When the rolling member 40 is pressing, since the first positioning member 32b is deformable, the auxiliary positioning element 24a is pressed by the rolling member 40. The auxiliary positioning element 24a presses the first positioning member 32b to deform, so as to attach the screen protector 22.

In this embodiment, the auxiliary positioning element 24a includes a top board 721 corresponding to the screen of the electronic device 20 and a side board 722 connected to the top board 721. The top board 721 and the side board 722 enclose to form an open rectangular frame which defines a space matching the size of the electronic device 20. The side board 722 can correspondingly match sides of the electronic device 20, to position the auxiliary positioning element 24a relative to the electronic device 20. When in use, the screen protector 22 is attached and connected to the top board 721, and the auxiliary positioning element 24a is covered on the electronic device 20, so that the screen protector 22 is positioned to the screen of the electronic device 20.

Referring to FIG. 13, an inner surface of the top board 721 defines a positioning plane for positioning the film to be pasted. The auxiliary positioning element 24a includes a positioning portion 73 for positioning the screen protector 22. Preferably, the space enclosed by the top board 721 and the side board 722 defines the positioning portion 73. The space matches the size of the screen protector 22 so that the screen protector 22 is easily positioned in the auxiliary positioning element 24a.

Figure 14:
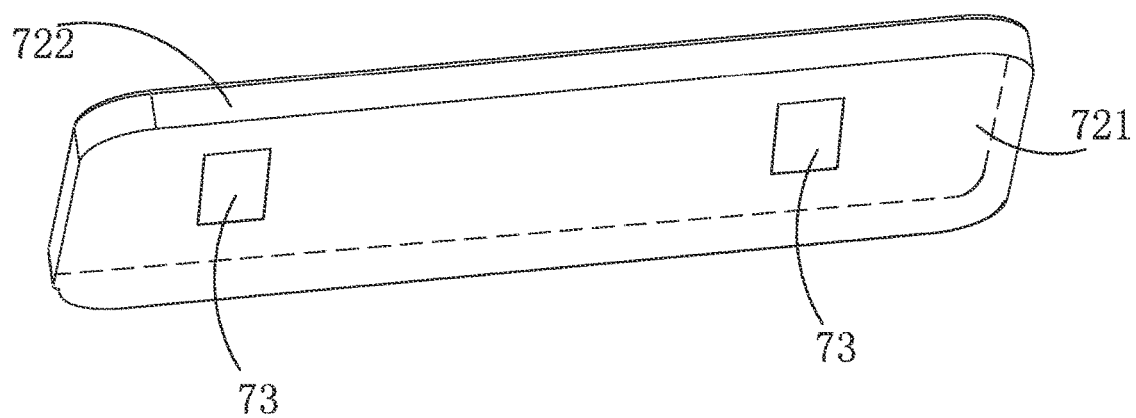
FIG. 14 is another schematic diagram of the inner side of the positioning member of the screen protector pasting box according to the second embodiment of the present invention.

Referring to FIG. 14, in other embodiments, the positioning portion 73 is an adhesive structure disposed on the inner surface of the top board 721. The viscosity of the adhesive structure is less than that between the screen protector 22 and the screen of the electronic device 20.

As an alternative embodiment, the space enclosed by the top board 721 and the side board 722 defines the positioning portion 73, and the space is larger than the size of the screen protector 22. In this case, a positioning line can be set inside the top board 721 to identify the position where the screen protector 22 is to be attached. Further, the accommodating space 313 is used to position the auxiliary positioning element 24a, thereby realizing the alignment of the screen protector 22 with the screen.

Referring to FIG. 13 again, in order to make the positioning plane inclined relative to the placing plane, the side board 722 corresponding to an end in a longitudinal direction of the auxiliary positioning element 24a is provided with a lug 76. That is, the side board 722 away from the rolling member 40 is provided with the lug 76.

When the lug 76 is disposed on the inner side of the side board 722, the lug 76 is against the electronic device 20 when the auxiliary positioning element 24a is covered on the connecting member 71. The end of the auxiliary positioning element 24a where the lug 76 is disposed is higher than the opposite end, so that the positioning plane is inclined relative to the placing plane.

Optionally, the lug 76 has elasticity, and the lug 76 or the first positioning member 32b can be made of materials such as silica gel or rubber. When the rolling member 40 slides and presses the top board 721, the lug 66 is deformed so that the screen protector 22 can be completely pasted to the electronic device 20.

Figure 15:
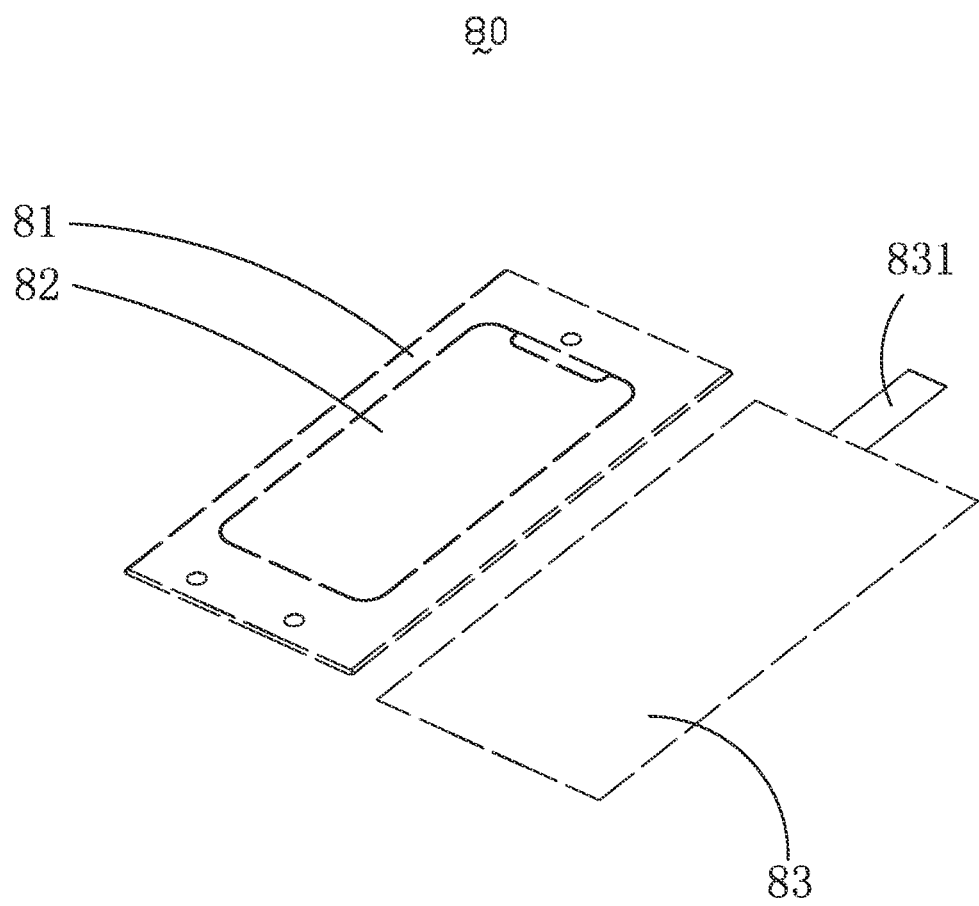
FIG. 15 is an exploded schematic diagram of a film according to a third embodiment of the present invention.

Referring to FIG. 15, a third embodiment of the present invention provides a film 80 which is applicable for the screen protector pasting box provided in the first embodiment, its alternative embodiments and the second embodiment. The film 80 includes an auxiliary positioning element 81, a screen protector 82 and a release film 83. In order to facilitate tearing off the release film 83, a tip 831 can be provided thereon.

In some embodiments, the auxiliary positioning element 81, the screen protector 82 and the release film 83 can be sequentially overlaid in a three-layer structure. Alternatively, the auxiliary positioning element 81 defines a cavity for accommodating the screen protector 82. The screen protector 82 is accommodated in the cavity, and the release film 83 is attached to a side of the screen protector 82 which is attached to the screen of the electronic device.

The foregoing descriptions of the embodiments according to the present invention should not be construed as limiting the scope of the invention but as merely providing illustrations of some of the preferred embodiments thereof. Thus the scope of the invention should be determined by the appended claims and their legal equivalents. Furthermore, it will be apparent to those skilled in the art that various modifications, equivalents and improvements can be made herein within the scope of the invention.

The invention claimed is:

1. A screen protector pasting box for pasting a screen protector to an electronic device, wherein a film comprises an auxiliary positioning element and a screen protector positioned on the auxiliary positioning element; the screen protector pasting box comprises a box body, the box body comprises a lower housing and a connecting member connected to and accommodated in the lower housing for placing the electronic device; the connecting member comprises a positioning portion for positioning the auxiliary positioning element to paste the screen protector to a screen of the electronic device;

wherein the box body further comprises a rolling member and a guide rail disposed on the lower housing, the rolling member can slide relative to the guide rail; the rolling member slides from one side with a smaller angle between a positioning plane and a placing plane to the other side with a larger angle;

wherein the screen protector pasting box further comprises an upper housing and a slider connected to two opposite sides of the upper housing, the rolling member is rotatably connected to the upper housing and the slider; the slider matches and slides on the guide rail.

2. The screen protector pasting box according to claim 1, wherein a surface, where the electronic device is contacted to the box body, is defined as the placing plane; and a surface, where the positioning portion and the auxiliary positioning element are connected, is defined as the positioning plane; the positioning plane and the placing plane are relatively inclined.

3. The screen protector pasting box according to claim 2, wherein the connecting member defines an accommodating space for accommodating the electronic device; the positioning portion comprises a first positioning member or a first positioning hole which is disposed at an end of the connecting member, the auxiliary positioning element comprises a through hole corresponding to the first positioning member, or a connecting column corresponding to the first positioning hole;

or, the positioning portion comprises the first positioning member which is disposed on an inner wall of the accommodating space, for overlapping one end of the auxiliary positioning element, and the first positioning member is deformable.

4. The screen protector pasting box according to claim 3, wherein the positioning portion further comprises a second positioning member, the first positioning member and the second positioning member are disposed on two opposite ends of the connecting member;

or, the positioning portion further comprises a second positioning hole, the first positioning hole and the second positioning hole are disposed on two opposite ends of the connecting member; or, the first positioning member and the second positioning hole are disposed on two opposite ends of the connecting member; or, the first positioning hole and the second positioning member are disposed on two opposite ends of the connecting member;

the auxiliary positioning element comprises the through hole corresponding to the second positioning member, or the connecting column corresponding to the second positioning hole.

5. The screen protector pasting box according to claim 4, wherein the positioning plane comprises a first locating surface; or the positioning plane comprises the first locating surface and a second locating surface;

the first positioning member or the first positioning hole defines the first locating surface, the second positioning member or the second positioning hole defines the second locating surface; the auxiliary positioning element is positioned on the first locating surface, or the auxiliary positioning element is positioned on the first locating surface and the second locating surface.

6. The screen protector pasting box according to claim 5, wherein when the positioning plane comprises the first positioning member or the first positioning hole, the positioning plane comprises the first locating surface; when the electronic device is placed in the accommodating space, the height of the first locating surface is higher than that of the screen of the electronic device, and the placing plane is parallel to a horizontal plane;

or, the height of the first locating surface is equal to that of the second locating surface, and the placing plane forms an angle with the horizontal plane;

or, the height of the first locating surface is higher than that of the second locating surface, and the placing plane is parallel to the horizontal plane.

7. The screen protector pasting box according to claim 4, wherein the number of the first positioning member or that of the first positioning hole is two; the number of the second positioning member or that of the second positioning hole is one.

8. The screen protector pasting box according to claim 3, wherein the first positioning member matches with the through hole.

9. The screen protector pasting box according to claim 1, wherein the screen protector pasting box further comprises a limiting element connected to both sides of the upper housing where the slider is disposed, and the connecting member defines a recess corresponding to the limiting element; when the slider slides to an end of the guide rail closed to the recess, the limiting element is rotatably against the recess; the upper housing can be accommodated in the box body.

10. The screen protector pasting box according to claim 9, wherein the limiting element comprises an arc surface, and the recess comprises an inclined surface; the arc surface resists against the inclined surface.

11. The screen protector pasting box according to claim 9, wherein the lower housing defines a slot between the connecting member and the guide rail for the limiting element being movably received therein.

12. The screen protector pasting box according to claim 1, wherein the rolling member comprises a first rolling part and a second rolling part disposed on two ends of the first rolling part, the hardness of the second rolling part is higher than that of the first rolling part; or the second rolling part is convex relative to the first rolling part.

13. The screen protector pasting box according to claim 1, wherein the connecting member and the lower housing are detachably connected.

14. The screen protector pasting box according to claim 13, wherein the lower housing comprises an engagement block, and the connecting member is provided with an engagement hole for engaging the engagement block.

15. The screen protector pasting box according to claim 1, wherein the lower housing defines a groove for accommodating a camera area of the electronic device.

\* \* \* \* \*